Patented June 14, 1927.

1,632,483

UNITED STATES PATENT OFFICE.

ROBERT BURNS MacMULLIN, OF NIAGARA FALLS, NEW YORK, ASSIGNOR TO THE MATHIESON ALKALI WORKS, OF NEW YORK, N. Y., A CORPORATION OF VIRGINIA.

MANUFACTURE OF HYPOCHLORITES.

No Drawing.    Application filed August 22, 1925. Serial No. 51,863.

This invention relates to improvements in the manufacture of hypochlorites such as calcium hypochlorite, and the invention includes improvements in processes of producing hypochlorites as well as improvements in certain novel steps of the process.

When chlorine reacts with an alkaline substance, such as lime, a part of the chlorine is converted into chloride and a part of the chlorine into hypochlorite. Commercial bleaching powder, for example, is a complex composition containing a part of its chlorine as chloride chlorine and a part of its chlorine in the form of hypochlorite chlorine. When bleaching powder is dissolved in water a solution containing calcium hypochlorite is formed, but calcium hypochlorite cannot be isolated by evaporation of such a solution as molecular compounds of calcium hypochlorite with calcium oxide and calcium chloride, originally present in the bleaching powder, again form. The presence of calcium chloride, which is inert as far as bleaching properties are concerned is objectionable for the reason that it cuts down the effective bleaching value as compared with a product in which all of the chlorine is present in the form of hypochlorite chlorine. The presence of calcium chloride is further objectionable in that it decreases the stability of the bleaching powder.

In United States Letters Patent No. 1,481,039 there is described a method of producing substantially pure hypochlorites which involves the separation of hypochlorous acid from an aqueous solution containing hypochlorite chlorine and chloride chlorine by treatment with an intermediate compound which forms an extract of hypochlorous acid immiscible with the aqueous solution. The process of the present invention also involves the separation of hypochlorous acid from an aqueous solution containing chloride chlorine by treatment with an intermediate compound; and the present invention likewise provides a calcium hypochlorite product which is made up essentially of calcium hypochlorite with a minimum amount of impurities, the product being associated with a small quantity of free lime, but being substantially free from chloride or the complex molecular compounds found in bleaching powder.

According to the present invention, this calcium hypochlorite, and hypochlorites of alkali forming or base forming metals, the alkalies and alkali earths, are produced by a method which involves the separation of hypochlorous acid from aqueous solutions by treatment with tertiary alcohols and the subsequent treatment of the tertiary alkyl hypochlorites formed to produce metallic hypochlorites. The invention also includes certain novel steps for the production of intermediate products, and improvements in the recovery of metallic hypochlorites from alkyl hypochlorites as well as improvements in a cyclic process of a character hereinafter more fully set forth.

The complete process of the invention, as applied to the manufacture of calcium hypochlorite, comprises the following steps:—1, the preparation of an aqueous solution containing hypochlorous acid and containing chloride chlorine; 2, separation of hypochlorous acid from the aqueous solution in the form of a tertiary alkyl hypochlorite; 3, treatment of the separated tertiary alkyl hypochlorite with lime to form calcium hypochlorite. According to this invention, the third step is carried out by dissolving the separated tertiary alkyl hypochlorite in a solvent in which water is soluble in substantial amounts followed by treatment of this solution with lime in the presence of water.

In carrying out the process of the present invention, the aqueous solution containing hypochlorous acid may be prepared by any known or suitable method, for example, by methods based upon the hydrolysis of chlorine according to the reaction

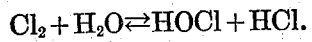

$$Cl_2 + H_2O \rightleftharpoons HOCl + HCl.$$

Hypochlorous acid may thus be made by adding chlorine to water in the presence of an alkaline substance, such as sodium bicarbonate or calcium carbonate, which is hydrolyzed to such an extent that it will react with the hydrochloric acid formed without reacting with the hypochlorous acid. Hypochlorous acid containing solutions may also be prepared by chlorination of solutions or suspensions containing alkaline substances such as sodium carbonate, sodium hydroxide, magnesium hydroxide, and hydrated lime.

A tertiary alcohol, such as tertiary amyl alcohol, is caused to react with the aqueous solution containing hypochlorous acid to form the corresponding tertiary alkyl hypochlorite. This reaction may be effected after preparation of the aqueous solution containing hypochlorous acid, or the chlorination of the aqueous solution and the formation of tertiary alkyl hypochlorite may be combined with advantage. The chlorination, or the last part of the chlorination, for example, may be carried out in the presence of the tertiary alcohol so that the hypochlorous acid combines with the alcohol as fast as it is formed, thereby preventing the concentration of hypochlorous acid from reaching any concentration which might tend to cause decomposition. By employing tertiary alcohols, a high chlorine efficiency and a high alcohol recovery can be obtained. The tertiary alkyl hypochlorites are also comparatively stable in storage when kept cool and in the dark.

In carrying out the process of the present invention, it is particularly advantageous to employ tertiary amyl alcohol or tertiary amylol. The tertiary amyl alcohol forms tertiary amyl hypochlorite with the hypochlorous acid in the aqueous solution, and this reaction product, being substantially insoluble in water or in the salt solutions formed by chlorination, floats on top of the aqueous layer. The aqueous layer and the tertiary amyl hypochlorite may be separated in any convenient or suitable manner. Other tertiary alcohols, such as tertiary butyl alcohol, are also useful in carrying out the process of the present invention.

After separation of the tertiary alkyl hypochlorite from the aqueous layer, it is treated with an alkaline substance, such as lime or other suitable metallic base, to form with the available hypochlorous acid the corresponding hypochlorite. The treatment may be carried out with an amount of alkaline substance sufficient to combine with all of the available hypochlorous acid or somewhat less, or with an excess of the alkaline substance to promote the completion of the reaction, in the presence of water. By properly regulating the addition of water the hypochlorite product may be recovered as a substantially dry solid product, or the hypochlorite product may be recovered in solution and the solution subjected to further treatment. The tertiary alcohol is regenerated and may be reused in the process.

The treatment of the alkyl hypochlorite with an alkaline substance is carried out after solution of the separated alkyl hypochlorite in a solvent in which water is soluble, say in amounts exceeding 0.5%. The water required in the reaction thus being supplied in solution, thereby promoting the reaction forming the metallic hypochlorite. For example, tertiary amyl hypochlorite, prepared as described, may be separated from the aqueous layer and mixed with from 1 to 5 volumes of tertiary amyl alcohol. This mixture, or solution, will dissolve from about 2.5% to 12%, by volume, of water, depending on the proportions of amyl alcohol to amyl hypochlorite, and will readily react with lime to form calcium hypochlorite. Water may be added to the mixture before, or after, or while adding and mixing the lime therewith, or at any of these times. By adding water sufficient to maintain the alcohol solution approximately saturated with water, the lime may be nearly completely converted to solid calcium hypochlorite. The hypochlorite product recovered in this way contains water of crystallization which can be removed by drying.

It is particularly advantageous to employ as a solvent for the alkyl hypochlorite, in carrying out the invention, the same alcohol as is employed in forming the alkyl hypochlorite. After separation of the metallic hypochlorite, the alcohol, which is regenerated by the reaction with the metallic base, may be returned for reaction with further quantities of the aqueous solution containing hypochlorous acid. Where the same alcohol is employed as a solvent as for the reaction with the solution containing hypochlorous acid, part of the alcohol from the step of treatment with the metallic base may be returned directly for reaction with further quantities of the aqueous solution containing hypochlorous acid, and the balance of the alcohol may be employed for mixing with the alkyl hypochlorite after separation from the aqueous layer. Any alkyl hypochlorite remaining in the alcohol returned for treatment of further quantities of the aqueous solution containing hypochlorous acid is recovered in the cycle and any water returned therewith separates with the aqueous solution as the insoluble alkyl hypochlorite is formed.

The production of calcium hypochlorite in accordance with the process of the present invention will be further illustrated by the following example:—20 kgs. of hydrated lime are added to between about 220 to 300 liters of water and chlorine is introduced into the resulting suspension with suitable cooling until all of the free lime has dissolved. A solution of calcium hypochlorite containing very little suspended matter is thus obtained. About 60 to 70 liters of tertiary amyl alcohol, or a mixture containing about this amount of tertiary amyl alcohol, are then mixed with the calcium hypochlorite solution, and the introduction of chlorine is continued until all of the calcium hypochlorite has been converted into hypochlorous acid. The amyl alcohol reacts with the hypochlorous acid as fast as it is formed to produce tertiary amyl hypochlorite. By making the amyl alcohol added equivalent to the chlorine introduced, the end products consist substantially of a calcium chloride solution of about 10% concentration and the insoluble tertiary amyl hypochlorite. After separation of the tertiary amyl hypochlorite, the aqueous layer may be reused, with the addition of similar quantities of lime and chlorine, and after second use the concentration of calcium chloride is about 17% at which concentration the solubility of tertiary amyl hypochlorite is but 0.2%. The heavy calcium chloride containing aqueous layer is separated, and, if to be discarded, is passed through a centrifugal separator to remove any suspended droplets of the tertiary amyl hypochlorite. About 300 to 350 liters of tertiary amyl alcohol, or a mixture containing about this amount of tertiary amyl alcohol is then added to the separated tertiary amyl hypochlorite, the latter amounting to about 83 liters. Excess dissolved water is forced out of solution in the alcohol during this mixture and is separated and used for making up the next initial batch of calcium hypochlorite solution. The solvent mixture now contains about 25% of tertiary amyl hypochlorite, and is free from suspended water. This solvent mixture is treated with 25 kgs. of 200 mesh hydrated lime with violent agitation. The temperature may be maintained, for example, from 5° to 35° C., but it is advantageous to maintain the temperature at about 15° C. The tertiary amyl hypochlorite present is in about 25% excess over the hydrated lime. Water is added during the lime treatment in such quantities as is necessary to maintain the tertiary amyl alcohol saturated as the conversion takes place. The slurry is then run through a filter or centrifuge and the alcohol solution separated from the solid calcium hypochlorite. The solid material separated weighs about 80 kgs. and contains about 45% of water of crystallization which can be removed by drying in a vacuum or in a current of dry air free from carbon dioxide at a temperature which should not exceed 55° C. The dried product weighs about 44 lbs. and contains from about 80% to 90% of calcium hypochlorite associated with small amounts of lime.

The operation of the foregoing example may be illustrated by the following type equations:—

1. $2Cl_2 + 2Ca(OH)_2 \rightarrow CaCl_2 + Ca(OCl)_2 + 2H_2O$

2. $2Cl_2 + Ca(OCl)_2 + 2H_2O \rightarrow CaCl_2 + 4HOCl$

3. $4HOCl + 4C_5H_{11}OH \rightarrow 4C_5H_{11}OCl + 4H_2O$

4. $4C_5H_{11}OCl + 2Ca(OH)_2 \rightarrow 2Ca(OCl)_2 + 4C_5H_{11}OH$

In carrying out the process of the invention in a continuous way according to the preceding example, the tertiary amyl alcohol solution recovered after conversion of the tertiary amyl hypochlorite to calcium hypochlorite and containing some unconverted tertiary amyl hypochlorite is reused in the process. For example, in the preceding example the recovered alcohol mixture amounts to about 415 liters containing about 5% of tertiary amyl hypochlorite, about 86% of amyl alcohol and about 8% of water. This solution is divided and about 70 liters of it are used in the treatment of the hypochlorous acid containing aqueous solution and about 345 liters of it are employed to dissolve the tertiary amyl hypochlorite separated from the aqueous solution.

The process of the present invention has several important advantages in the production of hypochlorites. When employing tertiary amyl alcohol in particular, the tertiary amyl hypochlorite and mixtures of it with tertiary amyl alcohol and water are very stable, and tertiary amyl alcohol is comparatively inert with respect to metallic hypochlorites such as calcium hypochlorite. Tertiary amyl alcohol likewise has a relatively high boiling point, about 103° C., reducing evaporation losses and also reducing any health hazard due to the presence of fumes of the reagent employed. Tertiary amyl hypochlorite is also very insoluble in water or in salt solutions such as solutions of calcium chloride. The process of the invention may be carried out with a high chlorine and alcohol efficiency, and may also be carried out in relatively compact apparatus.

The treatment of the alkyl hypochlorite is carried out in the presence of a solvent in which water is soluble and the process of the present invention has the advantage that the use of a solvent for the hypochlorite extract separated from the aqueous solution which will dissolve water materially assists in promoting the conversion of the hypochlorite extract to the desired metallic hypochlorite product. Where a solvent with which water is immiscible is employed, it is necessary, during the conversion treatment, to maintain the water in suspension in the solvent mixture, whereas in carrying out the present invention the water may be maintained present in solution in the solvent mixture where it is readily available for the conversion reaction. By employing tertiary alcohol for the separation of the hypochlorous acid from the aqueous solution and by employing additional quantities of the same alcohol for solution of the separated alkyl hypochlorite, the total amount of alcohol employed as a solvent and as a reagent may be reduced and the recovered alcohol may be directly reused in the process. While the use of a solvent in which water is insoluble is of special value and application in connection with the use of tertiary alcohols, this feature of the invention is of more general application to the recovery of hypochlorous acid as metallic hypochlorites from hypochlorous acid extracts such as are described in United States Letters Patent No. 1,481,039.

I claim:

1. The method of producing hypochlorites which comprises treating an aqueous solution containing hypochlorous acid with a tertiary alcohol, separating the tertiary alkyl hypochlorite formed from the aqueous solution, dissolving the separated alkyl hypochlorite in a solvent in which water is soluble and treating the solution of the alkyl hypochlorite with an alkaline substance in the presence of water to form the corresponding hypochlorite.

2. The method of producing hypochlorites which comprises treating an aqueous solution containing hypochlorous acid with a tertiary alcohol, separating the tertiary alkyl hypochlorite formed from the aqueous solution dissolving the separated alkyl hypochlorite in additional quantities of the tertiary alcohol, and treating the alcohol solution with an alkaline substance in the presence of water to form the corresponding hypochlorite.

3. The method of producing calcium hypochlorite which comprises treating an aqueous solution containing hypochloreus acid with tertiary amyl alcohol, separating the tertiary amyl hypochlorite formed from the aqueous solution, dissolving the separated tertiary amyl hypochlorite in tertiary amyl alcohol, and treating the alcohol solution of the tertiary amyl hypochlorite with lime in the presence of water to form calcium hypochlorite.

4. The method of producing calcium hypochlorite which comprises treating an aqueous solution containing hypochlorous acid with tertiary amyl alcohol, separating the tertiary amyl hypochlorite formed from the aqueous solution, dissolving the separated alkyl hypochlorite in tertiary amyl alcohol, and treating the alcohol solution with lime to form calcium hypochlorite while maintaining the alcohol solution saturated with water.

5. The cyclic method of producing hypochlorites which comprises treating an aqueous solution containing hypochlorous acid with a tertiary alcohol, separating the tertiary alkyl hypochlorite formed from the aqueous solution, dissolving the tertiary alkyl hypochlorite in additional quantities of the tertiary alcohol, causing the alcohol solution to react with an alkaline substance to form the corresponding hypochlorite and to regenerate tertiary alcohol from the tertiary alkyl hypochlorite, and returning part of the resulting tertiary alcohol to the treatment of further quantities of aqueous solution containing hypochlorous acid and part for dissolving the tertiary alkyl hypochlorite so formed.

6. The cyclic method of producing calcium hypochlorite which comprises treating an aqueous solution containing hypochlorous acid with tertiary amyl alcohol, separating the tertiary amyl hypochlorite formed from the aqueous solution, dissolving the tertiary amyl hypochlorite in additional quantities of tertiary amyl alcohol, causing the alcohol solution to react with lime to form calcium hypochlorite and to regenerate tertiary amyl alcohol from the tertiary amyl hypochlorite, and returning part of the tertiary amyl alcohol mixture for the treatment of further quantities of aqueous solution containing hypochlorous acid and part for dissolving the tertiary amyl hypochlorite so formed.

In testimony whereof I affix my signature.

ROBERT BURNS MacMULLIN.